United States Patent [19]
Chiu

[11] Patent Number: 5,749,485
[45] Date of Patent: May 12, 1998

[54] PORTABLE OIL CONTAINER

[76] Inventor: Chun Ta Chiu, 8F-2, No. 185 Fu Kou Road, Kaohsiung, Taiwan

[21] Appl. No.: 858,118

[22] Filed: May 19, 1997

[51] Int. Cl.⁶ .................................................. B65D 25/00
[52] U.S. Cl. ..................... 220/4.12; 220/4.14; 220/563; 220/564; 220/686; 220/735; 220/745; 220/678; 206/586
[58] Field of Search .................................. 220/563, 564, 220/4.14, 4.12, 735, 745, 752, 80.1, 80.2, 678, 686, 655; 206/586

[56] References Cited

U.S. PATENT DOCUMENTS

| | | | |
|---|---|---|---|
| 2,316,116 | 4/1943 | Thompson et al. | 220/564 |
| 2,339,303 | 1/1944 | Tillgry | 220/564 |
| 3,931,907 | 1/1976 | Henle | 220/564 |
| 4,179,030 | 12/1979 | Pasini | 220/563 |
| 5,251,773 | 10/1993 | Bowles et al. | 220/563 |
| 5,295,602 | 3/1994 | Swanson | 220/326 |
| 5,301,829 | 4/1994 | Chrisco | 220/326 |

*Primary Examiner*—Joseph M. Moy
*Attorney, Agent, or Firm*—Pro-Techtor International

[57] ABSTRACT

A portable oil container including a housing having an air port and an air vent, a carrying handle at the top of the housing, a handhold at one peripheral side of the housing, a wing screw adapted to seal the air vent, a feed pipe adapted to be connected to the oil port, a sealing cap adapted to seal the oil port when the feed pipe is not connected to the oil port, a springy pipe clamp welded to the housing at the top and adapted for holding the feed pipe when it is not in use, and a plurality of flat bumpers transversely disposed in parallel inside the housing and adapted to buffer contained oil when the housing is moved or turned.

3 Claims, 4 Drawing Sheets

PORTABLE OIL CONTAINER

BACKGROUND OF THE INVENTION

The present invention relates to a portable oil container for holding a fuel oil which can be conveniently operated to let the contained fuel oil to be fed into an oil tank of a machine or a motor vehicle.

Regular portable oil containers are commonly made from plastic, having an oil hole and an air vent respectively and detachably sealed by a respective sealing cap means. When pouring the contained fuel oil out of the oil hole into an oil filling hole of an oil tank of a machine or a motor vehicle, the fuel oil may be scattered over the outside of the oil tank. Further, because regular portable oil containers are made from plastic, they may be forced to break in case of a collision.

SUMMARY OF THE INVENTION

The present invention has been accomplished to provide a portable oil container which eliminates the aforesaid drawbacks. It is one object of the present invention to provide a portable oil container which has a high impact strength. It is another object of the present invention to provide a portable oil container which has means to buffer the flowing of the contained oil when the container is moved or turned. According to one aspect of the present invention, the portable oil container comprises a housing having an air port and an air vent, a carrying handle at the top of the housing, a handhold at one peripheral side of the housing, a wing screw adapted to seal the air vent, a feed pipe adapted to be connected to the oil port, a sealing cap adapted to seal the oil port when the feed pipe is not connected to the oil port, a springy pipe clamp welded to the housing at the top and adapted for holding the feed pipe when it is not in use, and a plurality of flat bumpers transversely disposed in parallel inside the housing and adapted to buffer contained oil when the housing is moved or turned. According to another aspect of the present invention, the wing screw is mounted with a gasket and having a longitudinal groove at the periphery extending to its bottom end. The longitudinal groove imparts an air passage for letting air pass in and out of the air vent to balance the inside pressure of the oil container with the pressure of the atmosphere when the wing screw is turned upwards from the air vent to carry the gasket away from the housing.

DETAILED DESCRIPTION OF THE PREFERRED EMBODIMENT

Figure 1:
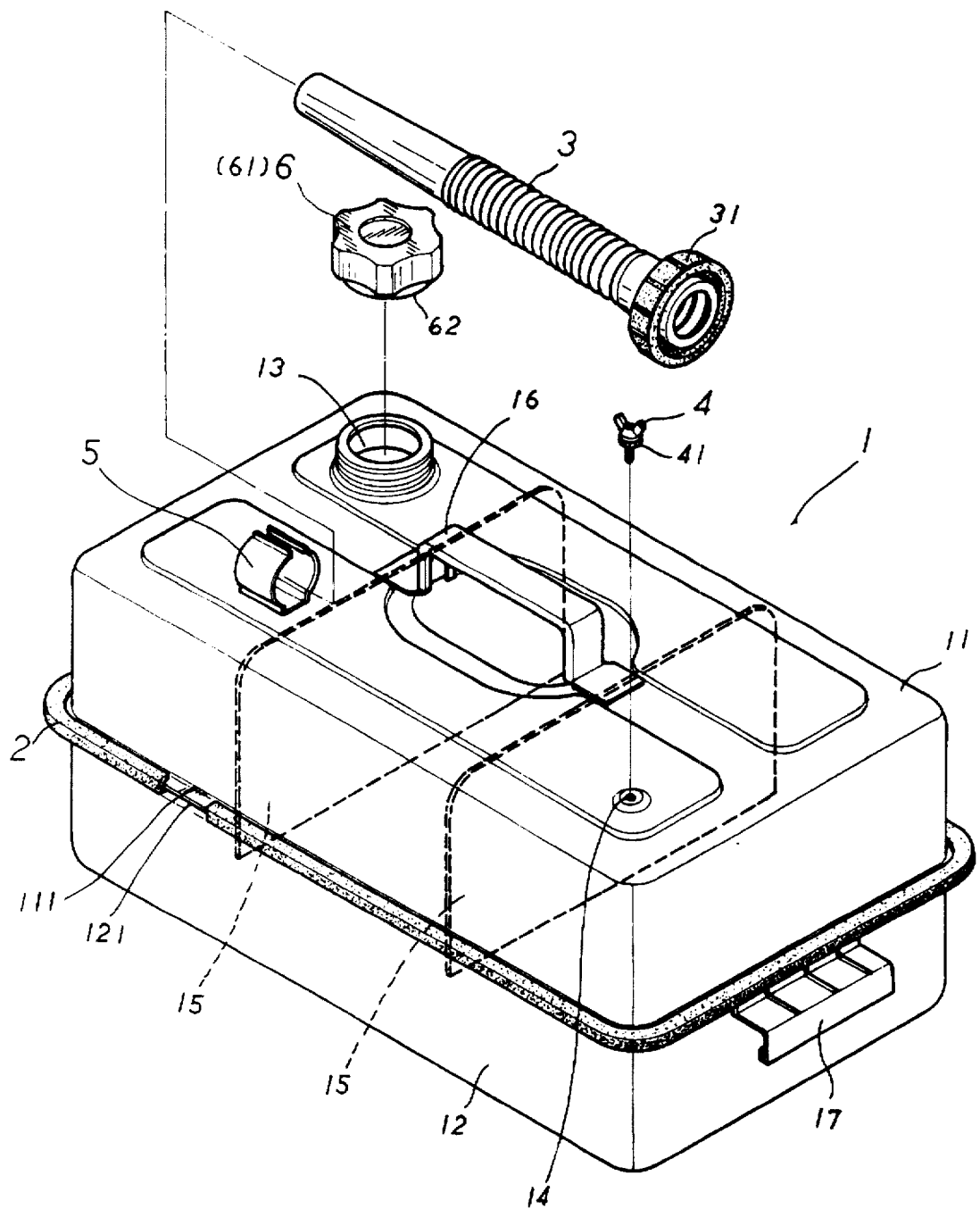
FIG. 1 is a perspective exploded view of a portable oil container according to the present invention.
Figure 2:
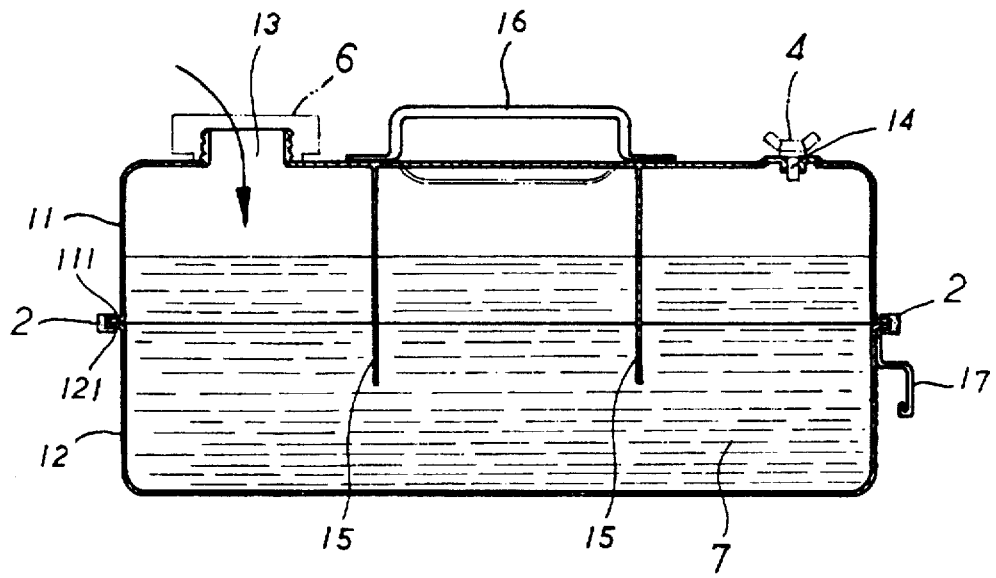
FIG. 2 is a side view in section of the portable oil container shown in FIG. 1.

Referring to FIGS. 1 and 2, a portable oil container in accordance with the present invention comprises a housing 1. The housing 1 is comprised of an upper cover shell 11 having an outward bottom coupling flange 111 around the border, and a bottom cover shell 12 having an outward top coupling flange 121 around the border. The upper cover shell 11 and the bottom cover shell 12 are made from corrosion protective steel. The bottom coupling flange 111 of the upper cover shell 11 and the top coupling flange 121 of the bottom cover shell 12 are fixedly fastened together and sealed by a rubber packing strip 2. The upper cover shell 11 is provided with an oil port 13 and an air vent 14. The oil port 13 is internally as well as externally threaded.

Figure 3:
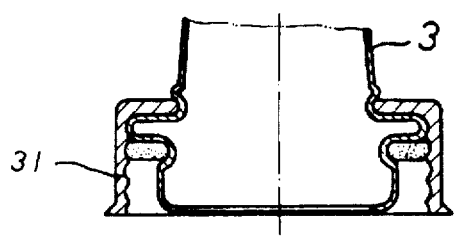
FIG. 3 is a sectional view of a part of the present invention, showing the connector of the feed pipe fastened to the oil port of he upper cover shell.
Figure 4:
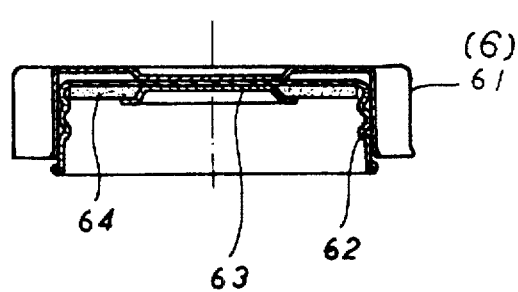
FIG. 4 is a sectional view of a part of the present invention, showing the sealing cap fastened to the oil port of the upper cover shell.
Figure 5:
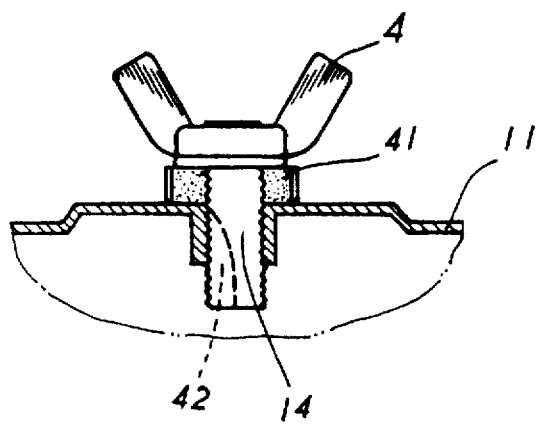
FIG. 5 is a sectional view of a part of the present invention, showing the wing screw fastened to the air vent of the upper cover shell.
Figure 5A:
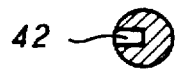
FIG. 5A is a cross sectional view of the wing screw according to the present invention.
Figure 6:
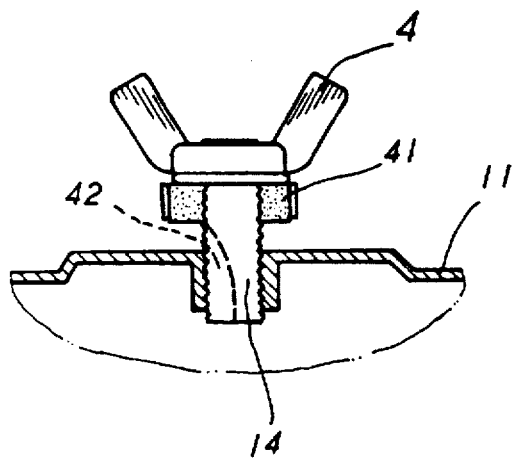
FIG. 6 is similar to FIG. 5 but showing the wing screw loosened.
Figure 7:
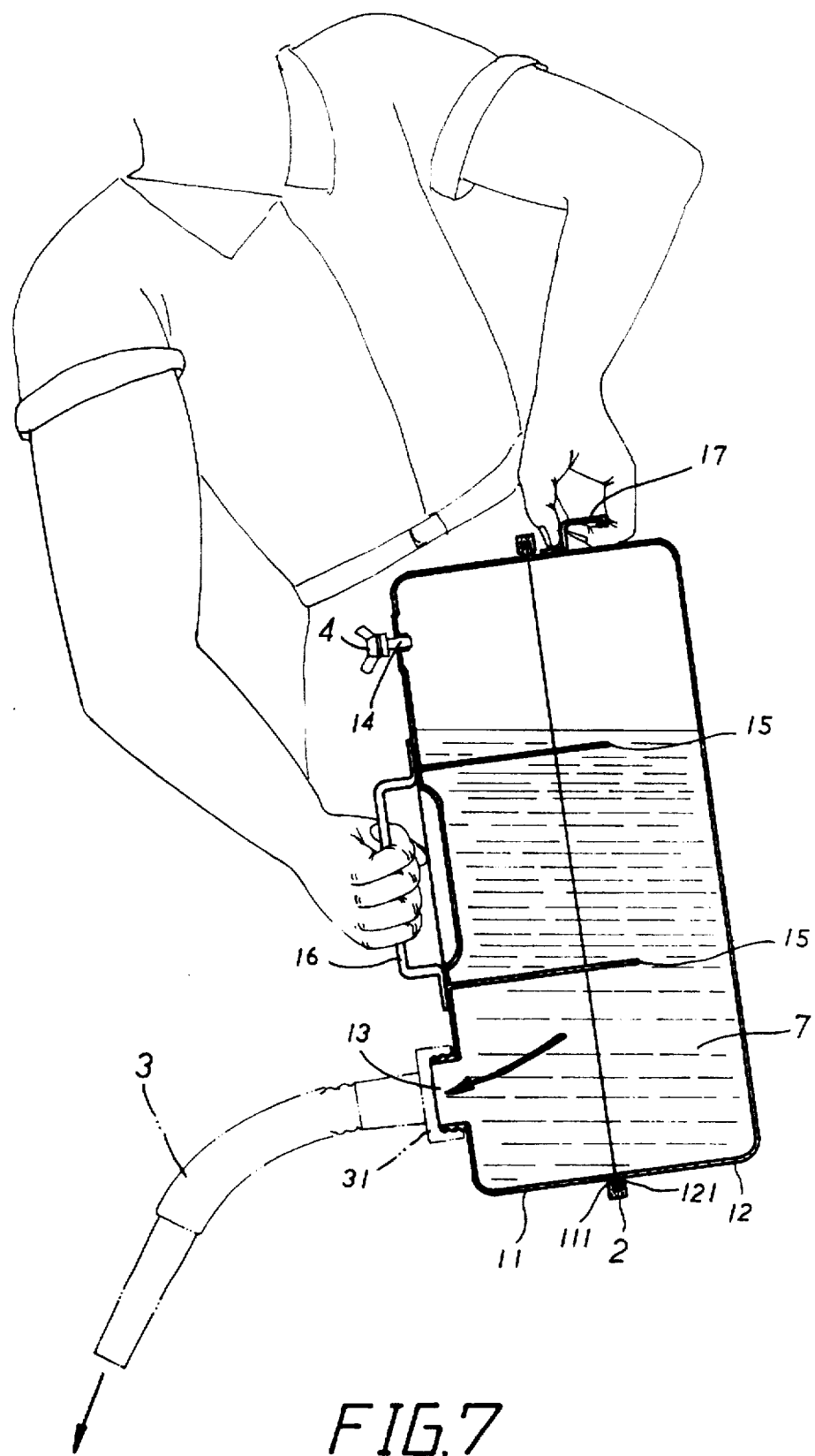
FIG. 7 is an applied view of the present invention, showing the portable oil container lifted and turned to a vertical position, and the contained oil poured out of the feed pipe.

Referring to FIGS. 3 to 7 and FIGS. 1 and 2 again, a feed pipe 3 is provided having a connector 31 at one end fastened to the oil port 13 of the housing 1 by a screw joint (see FIGS. 3 and 7). The air vent 14 is provided with an inner thread 141. A wing screw 4 is threaded into the inner thread 141 of the air vent 14. A gasket 41 is mounted on the wing screw 4 and forced by it to seal the air vent 14 (see FIG. 5). The wing screw 4 has a longitudinal groove 42 (see FIGS. 5 and 5A). When the wing screw 4 is turned outwards from the air vent 14 to move the gasket 41 away from the outside wall of the upper cover shell 11, air is allowed to pass through the air vent 14, permitting the inside pressure of the housing 1 to be balanced with the pressure of the atmosphere (see FIG. 6). A springy pipe clamp 5 is welded to the upper cover shell 11 on the outside for holding the feed pipe 3 in a collapsed position. A plurality of flat bumpers 15 are transversely disposed in parallel inside the upper cover shell 11 which buffer contained oil when the housing 1 is moved or turned. The flat bumpers 15 have a height over one half of the height of the housing 1. A carrying handle 16 is provided at the top of the upper cover shell 11 for carrying by hand. A handhold 17 is provided at one peripheral side of the housing 1 (for example, at one peripheral side of the bottom cover shell 12) remote from the oil port 13 for the holding of the hand. Further a sealing cap 6 is provided to seal the oil port 13 when the feed pipe 3 is disconnected from the oil port 13 and secured to the springy pipe clamp 5 (see FIGS. 1 and 2). The sealing cap 6 comprises outer cap shell 61 threaded onto the oil port 13, an inner cap shell 62 threaded into the oil port 13, an inside locating flange 63 raised from the inner cap shell 62 on the inside, and a gasket 64 mounted inside the inner cap shell 62 and secured in place by the inside locating flange 63 (see FIG. 4).

Referring to FIG. 2 again, when not in use, the sealing cap 6 and the wing screw 4 are respectively fastened to the oil port 13 and the air vent 14 to keep the housing 1 in a water tight condition.

Referring to FIGS. 6 and 7 again, when in use, the wing screw 4 is loosened to let the inside pressure of the housing 1 to be balanced with the pressure of the atmosphere (see FIG. 6), then sealing cap 6 is removed from the oil port 13 and the feed pipe 3 is fastened to the oil port 13, and then the user's both hands can lift the housing 1 and turn it to a vertical position through the carrying handle 16 and the handhold 17 to let contained oil be poured out of the housing 1 through the feed pipe 3 into an oil tank of a machine.

While only one embodiment of the present invention has been shown and described, it will be understood that various modifications and changes could be made thereunto without departing from the spirit and scope of the invention disclosed.

What the invention claimed is:

1. A portable oil container comprising a steel housing defining an oil chamber for an oil and having an oil port through which an oil is filled into or poured out of said oil chamber and an internally threaded air vent for communication between said oil chamber and the atmosphere, a carrying handle provided at a top side of said housing, a wing screw threaded into said air vent to seal its passage, and a feed pipe adapted to be connected to said oil port, and a sealing cap adapted to seal said oil port when said feed pipe is not connected to said oil port, wherein said housing is comprised of an upper cover shell having an outward bottom coupling flange, a bottom cover shell having an outward top coupling flange fastened to the outward bottom coupling flange of said upper cover shell, and a rubber packing strip fastened to said outward bottom coupling flange and said outward top coupling flange to seal the gap; a springy pipe clamp is welded to said upper cover shell on the outside and adapted for holding said feed pipe when said feed pipe is not connected to said oil port; a handhold is provided at one peripheral side of said housing remote from said oil port; a plurality of flat bumpers are transversely disposed in parallel inside said upper cover shell and adapted to buffer the oil contained in said housing when said housing is moved or turned.

2. The portable oil container of claim 1, wherein said flat bumpers have a height over one half of the height of said housing.

3. The portable oil container of claim 1, wherein said wing screw is mounted with a gasket and having a longitudinal groove at the periphery extending to a bottom end thereof, said longitudinal groove imparting an air passage for letting air pass in and out of said air vent when said wing screw is turned upwards from said air vent to carry said gasket away from said housing.

* * * * *